(12) United States Patent
Kuhlmann (10) Patent No.: US 11,237,561 B2
(45) Date of Patent: Feb. 1, 2022

(54) AIRCRAFT AND METHOD OF STABILIZING AN AIRCRAFT

(71) Applicant: FLYING WHALES, Suresnes (FR)

(72) Inventor: Hervé François Kuhlmann, Montrouge (FR)

(73) Assignee: FLYING WHALES, Suresnes (FR)

( * ) Notice: Subject to any disclaimer, the term of this patent is extended or adjusted under 35 U.S.C. 154(b) by 0 days.

(21) Appl. No.: 15/575,508

(22) PCT Filed: May 12, 2016

(86) PCT No.: PCT/EP2016/060675
§ 371 (c)(1),
(2) Date: Nov. 20, 2017

(87) PCT Pub. No.: WO2016/188759
PCT Pub. Date: Dec. 1, 2016

(65) Prior Publication Data
US 2018/0157261 A1 Jun. 7, 2018

(30) Foreign Application Priority Data
May 22, 2015 (FR) ...................................... 1554647

(51) Int. Cl.
*G05D 1/02* (2020.01)
*G05D 1/08* (2006.01)
(Continued)

(52) U.S. Cl.
CPC ........... *G05D 1/0204* (2013.01); *B64D 31/06* (2013.01); *G01S 17/95* (2013.01); *G05D 1/0816* (2013.01); *B64B 1/12* (2013.01); *B64B 1/32* (2013.01)

(58) Field of Classification Search
CPC .. G05D 1/0204; G05D 1/0066; G05D 1/0816; B64B 1/00–70; B64D 31/06; G01S 17/95
(Continued)

(56) References Cited

U.S. PATENT DOCUMENTS

| 6,609,421 B2 * | 8/2003 | Cronin | G01P 5/165 73/170.01 |
| 2005/0035242 A1 | 2/2005 | Nugent et al. | |

(Continued)

FOREIGN PATENT DOCUMENTS

| FR | 2772714 A1 * | 6/1999 | ............... B64B 1/42 |
| FR | 2772714 A1 | 6/1999 | |

OTHER PUBLICATIONS

Vermillion et al., "Model-Based Plant Design and Hierarchical Control of a Prototype Lighter-Than-Air Wind Energy System, With Experimental Flight Test Results," IEEE Transactions on Control Systems Technology (2014), 22(2), pp. 531-542.
(Continued)

*Primary Examiner* — Isaac G Smith
(74) *Attorney, Agent, or Firm* — Greer, Burns & Crain Ltd.

(57) ABSTRACT

An aircraft is provided, including: at least one sensor for measuring a wind; actuators (motors, control surfaces, etc.); a data base embedded aboard the aircraft, the data base associating various values of wind measurement with various set points for the attention of the actuators. The aircraft furthermore includes a system of analysis and control, arranged so as, or programmed so as:
to receive values of wind measurement originating from the at least one sensor;
searching, inside the data base, for a correspondence of the wind measurement values originating from the at least one sensor, and determining (as a function of this search) the directives to be dispatched to the actuators, and
dispatching these determined directives to the actuators.

16 Claims, 3 Drawing Sheets

(51) Int. Cl.
    *B64D 31/06*     (2006.01)
    *G01S 17/95*     (2006.01)
    *B64B 1/12*     (2006.01)
    *B64B 1/32*     (2006.01)

(58) Field of Classification Search
    USPC .................................................. 701/3, 10
    See application file for complete search history.

(56) References Cited

U.S. PATENT DOCUMENTS

| | | | |
|---|---|---|---|
| 2009/0048723 A1* | 2/2009 | Nugent | B64C 13/16 |
| | | | 701/10 |
| 2011/0043785 A1* | 2/2011 | Cates | G01P 3/366 |
| | | | 356/28 |
| 2012/0018571 A1* | 1/2012 | Goelet | B64B 1/005 |
| | | | 244/30 |
| 2015/0021443 A1* | 1/2015 | Wildschek | G05D 1/0066 |
| | | | 244/76 C |
| 2015/0060593 A1* | 3/2015 | Prince | B64C 5/12 |
| | | | 244/3.21 |
| 2015/0298786 A1* | 10/2015 | Stigler | B64B 1/10 |
| | | | 244/30 |

OTHER PUBLICATIONS

French Search Report from French Patent Application No. 1554647, dated Mar. 14, 2016.
International Search Report from corresponding International Patent Application No. PCT/EP/, dated Sep. 9, 2016.

* cited by examiner

AIRCRAFT AND METHOD OF STABILIZING AN AIRCRAFT

BACKGROUND

The present invention relates to an aircraft. It also relates to a method utilized by an aircraft.

Such an aircraft or method makes it possible to stabilize the aircraft that is subjected to wind variations such as gusts or turbulences. The field of the invention is more particularly, but non-limitatively, that of lighter-than-air aircraft.

Flight stability in a turbulent environment (in particular for improving passenger comfort) is a recurring topic in the aeronautical world.

The detection and forecasting of gusts of wind are fundamental elements in keeping to an aircraft flight plan. This is even more important for a lighter-than-air aircraft, given its large windage and its relatively low manoeuvrability due to its inertia.

Several solutions are known from the state of the art for detecting or forecasting such gusts for an aircraft:
- "piloting" technologies, which are based on an action by the pilot or pilots, following captured information displayed in the cockpit,
- "warning" technologies, which are based on detecting turbulences so as to be able to warn the passengers of entering a turbulence zone,
- "absorption" technologies, which are based on mechanical systems (gust absorber) making it possible to stabilize flight.

Several problems arise:
- reaction time: reaction times can be too long in relation to the sudden onset of squalls or gusts or turbulences (in particular for "piloting" technologies),
- hovering flight or direction of flight: certain technologies, (in particular that of "absorption") are generally not effective in hovering flight but only in cruise flight at high speeds, and furthermore their operation only makes stabilization possible in the direction of flight,
- becoming endangered during hovering flight: during the loading/unloading phases in hovering flight a lighter-than-air aircraft is extremely vulnerable to turbulent wind. The effect of gusts can in fact generate severe instabilities leading in extreme cases to endangering the lighter-than-air aircraft.
- accuracy of hovering flight: in the event of positioning a load, the accuracy of the hovering flight can be very important. Gusts can cause a significant deterioration in this accuracy, to the detriment of its operational capabilities.

The purpose of the present invention is to solve at least one of the aforementioned problems or disadvantages.

SUMMARY

This objective is achieved with an aircraft comprising:
- at least one sensor, arranged in order to measure a wind,
- actuators,
- an on-board database in the aircraft, the database associating different wind measurement values with different instructions intended for the actuators,
- analysis and control means, arranged or programmed in order to:
  - receive wind measurement values originating from the at least one sensor,
  - search, within the database, for a match with the wind measurement values originating from the at least one sensor, and determine, as a function of this search, instructions to be sent to the actuators,
  - send these determined instructions to the actuators.

The at least one sensor is preferably arranged in order to measure a wind at a measurement frequency of at least 0.1 Hz, preferably at least 1 Hz. The analysis and control means are preferably arranged or programmed in order to determine instructions to be sent to the actuators at a frequency of at least 0.1 Hz, preferably at least 1 Hz.

The aircraft according to the invention is preferably arranged in order to perform hovering flight.

The aircraft according to the invention preferably consists of a lighter-than-air aircraft.

The at least one sensor is preferably arranged in order to measure the wind remotely.

The wind measurement values can comprise:
- an amplitude or a variation in amplitude of the wind, and/or
- an origin or a direction of the wind, or a variation in the origin or direction of the wind.

The analysis and control means can be arranged or programmed in order to send the instructions directly to the actuators, without the need for a validation or approval step by a human operator.

The aircraft according to the invention can also comprise means for measuring the effects, on the position of the aircraft, of the instructions determined then sent to the actuators. In this case, the analysis and control means can also be arranged or programmed in order to modify the database as a function of the measured effects.

The actuators can comprise propulsion means of the aircraft and/or control surfaces of the aircraft.

The at least one sensor is preferably arranged in order to measure winds in several directions or from several origins.

According to yet another aspect of the invention, a method is proposed for stabilizing an aircraft (preferably utilized in an aircraft according to the invention) comprising:
- measurement of a wind by at least one sensor of the aircraft
- analysis and control, by on-board analysis and control means in the aircraft, comprising:
  - receiving wind measurement values originating from the at least one sensor,
  - searching, within an on-board database in the aircraft, which associates different wind measurement values with different instructions intended for actuators of the aircraft, for a match with the wind measurement values originating from the at least one sensor,
  - determining, as a function of this search, instructions to be sent to the actuators,
  - sending these determined instructions to the actuators.

The at least one sensor preferably measures a wind at a measurement frequency of at least 0.1 Hz, preferably at least 1 Hz. The analysis and control means preferably determine instructions to be sent to the actuators at a frequency of at least 0.1 Hz, preferably at least 1 Hz.

During this method according to the invention, the aircraft can perform hovering flight.

The aircraft according to the invention is preferably a lighter-than-air aircraft.

The at least one sensor preferably measures the wind remotely.

The wind measurement values can comprise:
- an amplitude or a variation in amplitude of the wind, and/or an origin or a direction of the wind, or a variation in the origin or direction of the wind.

The analysis and control means preferably send the instructions directly to the actuators, without a validation or approval step by a human operator.

The method according to the invention can also comprise measuring the effects, on the position of the aircraft, of the instructions determined then sent to the actuators. In this case, the method according to the invention can also comprise modification of the database, by the analysis and control means, as a function of the measured effects.

The actuators can comprise propulsion means of the aircraft and/or control surfaces of the aircraft.

The at least one sensor can measure winds in several directions or from several origins.

BRIEF DESCRIPTION OF THE DRAWINGS

Other advantages and characteristics of the invention will become apparent on examination of the detailed description of utilizations and embodiments which are in no way limitative, and the attached drawings, in which.

DETAILED DESCRIPTION

As these embodiments are in no way limitative, variants of the invention can be considered, comprising only a selection of the characteristics described or shown hereinafter, in isolation from the other characteristics described or shown (even if this selection is isolated within a phrase comprising these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

Firstly, a first embodiment of the aircraft 1 according to the invention will be described, with reference to FIGS. 1a, 1b, 2, 3 and 4.

In the present description, the term "aircraft" denotes any means of transport (of persons or goods) capable of movement by flying.

The aircraft 1 is arranged in order to perform hovering flight. This is understood to mean that the aircraft 1 is capable (in the absence of wind) of flight in a fixed position with respect to the ground, as is the case for a dirigible or a helicopter.

More particularly, the aircraft 1 consists of a lighter-than-air aircraft.

In the present description, the term lighter-than-air aircraft is an aircraft the lift of which is provided by buoyancy (unlike a heavier-than-air aircraft) such as for example a balloon with nacelle or a dirigible.

The lighter-than-air aircraft 1 (a vehicle the lift of which is ensured by a gas that is lighter than the ambient air surrounding it, i.e. a balloon or a dirigible) is a dirigible intended for carrying loads.

In this non-limitative example, the lighter-than-air aircraft 1 used is a dirigible having a length of 70 m and a volume of 6000 $m^3$ of helium. The lighter-than-air aircraft 1 moves horizontally with the aid of four engines 41 (electric motors or thermal engines), distributed at intervals of 90° around the circumference of the lighter-than-air aircraft 1 (preferably in a substantially horizontal plane parallel to the plane of FIGS. 1a, 2 and 3), including:
  two front/rear engines 41, 411 that have a reversible direction of propulsion, and
  two lateral engines 41, 412 that are vectorable or orientable (operating both for vertical propulsion upwards or downwards and for horizontal propulsion forwards or backwards) and which also have a reversible direction of propulsion.

The engines 41 are for example thermal engines having an individual power P=160 kW, SMA reference FR305-230E, equipped with a pair of contra-rotating propellers.

In order to ensure sufficiently accurate positioning of the load carried, the aircraft 1 is equipped with an active flight stabilization system of the aircraft 1 (comprising the means 2, 4, 5 and 6 described hereinafter), that is effective in a turbulent environment and in hovering flight. The stabilization system makes it possible, based on a remote sensing wind measurement (speed and intensity), to anticipate the behavioural response of the aircraft 1 in all directions, and thus to operate the actuators 4 in order to ensure its stability.

The aircraft 1 comprises at least one sensor 2, arranged in order to measure wind 3. By wind 3 is meant in the present description any air movement (preferably towards the aircraft 1), preferably comprising one or more turbulence(s) and/or one or more gust(s) and/or one or more squall(s).

The at least one sensor 2 is arranged in order to measure the wind 3 remotely (by transmitting a signal 22), i.e. before this wind 3 comes into contact with the aircraft 1. Each sensor 2 can thus comprise one or more LIDAR (light detection and ranging) device (a remote measurement technology based on analysis of the properties of a light beam reflected back to its emitter) and/or one or more SODAR (sonic detection and ranging) device (a sensor that uses sound waves for measuring wind speed and direction).

The sensors 2 are arranged together in order to measure winds 3 in several directions or from several origins. More precisely, the measurement sensors 2 are placed so as to capture information in all directions around the aircraft 1, in order to detect the gusts of wind 3.

The at least one sensor 2 comprises several sensors 2 (at least four, preferably at least six sensors 2). The embodiment shown in the figures comprises six sensors 2.

Of these (six) sensors, several (four, cf FIG. 1a) sensors 2 are distributed in one and the same horizontal plane (a horizontal plane being defined as perpendicular to the vertical, i.e. the direction of attraction of gravity).

Of these (six) sensors, several (four, cf FIG. 1b) sensors 2 are distributed in one and the same vertical plane.

In the example shown in the figures, the lighter-than-air aircraft 1 is equipped with several sensors 2 of the LIDAR type (pulsed laser, wavelength $\lambda$=1.54 µm) making it possible to measure the speed of the wind 3 in all horizontal directions. To this end, measurement lines, for example 24, are positioned on the circumference of the lighter-than-air aircraft 1. Each sensor 2 is arranged in order to measure the speed of the wind 3 at a distance comprised between 40 m and 400 m from the lighter-than-air aircraft 1 with a range gate of 10 or 20 m (which corresponds to 10 simultaneous measurements per beam). A vertical wind measurement (from a sensor 2 equipped with four beams for example) makes it possible to increase the measurement accuracy. Each on-board LIDAR 2 is for example a Wind Iris. Each sensor 2 comprises at least two measurement lines making it possible to measure two coordinates of the wind speed. In the present embodiment, each sensor 2 comprises four measurement lines making it possible to measure a third wind speed coordinate. The aircraft 1 comprises at least six LIDAR sensors, i.e. at least 24 measurement lines.

The at least one sensor 2 is arranged in order to measure a wind 3 at a measurement frequency of at least 0.1 Hz, preferably at least 1 Hz.

The aircraft 1 comprises actuators 4, arranged in order to modify a position of the aircraft 1 in flight as a function of instructions received by these actuators 4.

The actuators 4 comprise propulsion means (the engines 41) and control surfaces 42.

This embodiment comprises four engines 41 and four control surfaces 42.

The control surfaces 42 are moveable devices that make it possible to produce or to control the movements of the aircraft 1, for example the angle of attack or the angle of sideslip of the aircraft 1.

These actuators 4 can be dedicated to the stabilization system according to the invention or not.

The aircraft 1 comprises an on-board computerized and/or electronic database 6 in the aircraft 1. The database 6 associates different wind measurement values with different instructions intended for the actuators 4. These instructions are provided in order to compensate for the effect, on the aircraft 1, of the wind 3, having measurement values associated with these instructions in the database 6.

This database 6 is constructed:
By aerodynamic calculations that simulate the effects of several wind measurement values on the aircraft 1, and calculates the theoretical instructions to be sent to the actuators 4 in order to compensate for these effects, and/or
By empirical data (obtained for example in a wind tunnel on the aircraft 1, or by hydrodynamic tests on a mock-up or by tests of the aircraft 1 in flight, or by digital simulations), obtained by subjecting the aircraft 1 to different values for wind 3 and by testing different instructions sent to the actuators 4 until the effects of this wind 3 are satisfactorily compensated for.

The database 6 comprises a computer, and/or a central processing or computing unit, and/or an analogue electronic circuit (preferably dedicated) and/or a digital electronic circuit (preferably dedicated) and/or a microprocessor (preferably dedicated), and/or software means. In the present embodiment, the database 6 is stored on the flash memory in the calculator 5 described hereinafter. This database 6 is typically in the form of a look-up table, for example in a format of the "csv" type.

The aircraft 1 comprises analysis and control means 5 (also called "calculator" 5).

The analysis and control means 5 comprise a computer, and/or a central processing or computing unit, and/or an analogue electronic circuit (preferably dedicated) and/or a digital electronic circuit (preferably dedicated) and/or a microprocessor (preferably dedicated), and/or software means.

As will be seen hereinafter, the analysis and control means 5 are arranged (for example by comprising a dedicated electronic card) and/or more precisely programmed (for example by comprising software means) in order to carry out certain functions or operations or control or calculation, etc.

As will be seen hereinafter, each of the steps of the method according to the invention utilized by the aircraft 1 is not carried out in a purely abstract or purely intellectual manner, but
is performed automatically (excluding all human intervention), and
involves the use of at least one technical means.

The analysis and control means 5 are arranged and/or programmed in order to:
receive, originating from the at least one sensor 2, measurement values of a wind 3,
search, within the database 6, for a match with these wind measurement values originating from the at least one sensor 2,
determine, as a function of the result of this search, instructions to be sent to the actuators 4, and
send these determined instructions to the actuators 4 (the calculator 5 sends the instructions that control the engines 41 and the control surfaces 42).

The wind measurement values typically comprise (preferably for each point of several points in space around the aircraft 1):
at least one amplitude or at least one variation (in the case of a gust of wind 3) in the amplitude of the wind 3, each amplitude typically being a wind speed or intensity. The at least one (variation in the) amplitude can thus comprise a (variation in the) local speed of the wind 3 and a (variation in the) approach speed of the wind 3 towards the aircraft 1: it will be understood for example that in the case of a tornado, the local wind speed inside the tornado can be very high but this tornado can have a fixed position (and thus an approach speed of zero) with respect to the aircraft 1, and
at least one origin (for example a position of wind 3 with respect to the aircraft 1, and/or a number of the sensor 2 having detected this wind 3) and/or a direction of the wind 3 (or at least one variation in the origin or direction of the wind 3). The at least one (variation in the) direction can thus comprise a (variation in the) local direction of the speed vector of the wind 3 and a (variation in the) approach direction of the wind 3 towards the aircraft 1: it will be understood for example that in the case of a tornado, the local wind speed inside the tornado can have a rotational direction about a centre of the tornado but this tornado can have a fixed position (and thus no approach direction) with respect to the aircraft 1;
and optionally a distance of this wind 3 with respect to the aircraft 1.

The analysis and control means 5 are also arranged and/or programmed in order to convert the measurement values originating from the at least one sensor 2 into a format adopted in (or compatible with) the database 6 (i.e. convert the measurement information into data that are known or can be used by the database 6).

Typically, this transformation (carried out by the calculator 5) consists of reconstructing a wind field based on separate measurements from several of the sensors 2 (for example 24 beams with 10 measurement points i.e. 240 points every second for a measurement at 1 Hz). On each measurement (every second for a measurement at 1 Hz), these points are interpolated in order to reconstruct a three-dimensional vector field representing directions and speeds of the wind 3 in the space surrounding the aircraft 1.

The analysis and control means 5 are arranged and/or programmed in order to send the instructions directly to the actuators 4, without the need for a validation or approval step by a human operator (such as a pilot of the aircraft 1 for example).

Thus, each sensor 2 is linked to the on-board calculator 5 dedicated to the stabilization system. The communication protocol between the sensors 2 and the calculator 5 will preferably be based on the CAN (Controller Area Network) system, which is a serial bus system that due to its reliability is suitable for real-time on-board systems. This analyzes the data originating from the sensors 2 in order to identify the disturbances. It then compares these disturbances to the database 6 established beforehand. The database 6 is stored in a memory of the calculator 5. The data of the database 6 define or associate for each "case" (i.e. field of speeds and directions of the wind 3), a response strategy, i.e. instructions intended for the actuators 4. A certain number of external data items can also, if desired, be taken into account in the choice of the response strategy, such as:

flight data, such as for example IAS data (for "Instant Air Speed" or instantaneous speed of air or wind), IGS data (for "Instant Ground Speed" or instantaneous speed of the aircraft 1 relative to the ground), system data (engines, propellers, . . . ), GPS location data;

environmental data such as for example topography around the aircraft, temperature, humidity, etc.

In order to carry out these operations, the calculator 5 has a computing power typically corresponding to at least that of a Xeon E3-1220 CPU clocked at 3.10 GHz and a storage capacity of at least a 2 Gb memory. The algorithm (which compares the values captured by the sensors 2 and the data originating from the database 6) is for example produced in a LabVIEW environment or in C language.

The analysis and control means 5 are arranged or programmed in order to determine instructions to be sent to the actuators 4 at a frequency of at least 0.1 Hz, preferably at least 1 Hz.

The aircraft 1 also comprises means (not shown) for measuring the effects, on the position of the aircraft 1, of the instructions determined and then sent to the actuators 4; and the analysis and control means 5 are also arranged and/or programmed in order to modify, in the database 6, the instructions associated with these wind measurement values as a function of the measured effects, so as to improve the compensation for the wind by the instructions contained in the database 6.

In order to measure these effects, inertial data are used (obtained with an inertial navigation system) as well as GPS data, all these data being recorded.

Figure 1A:
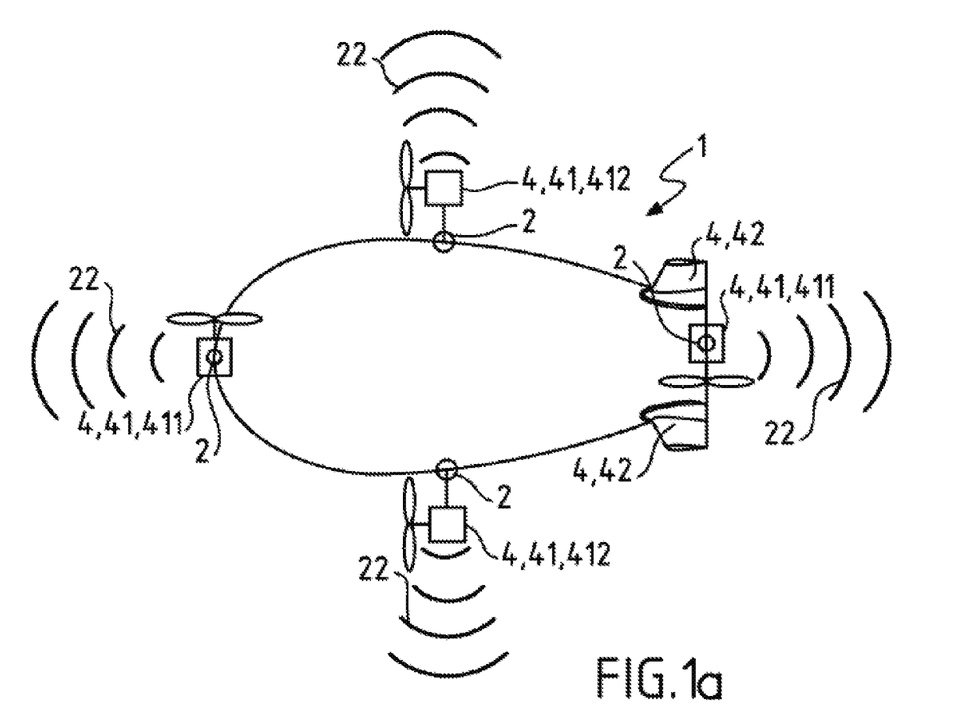
FIG. 1a is a diagrammatic top view of a first embodiment of an aircraft 1 according to the invention.
Figure 1B:
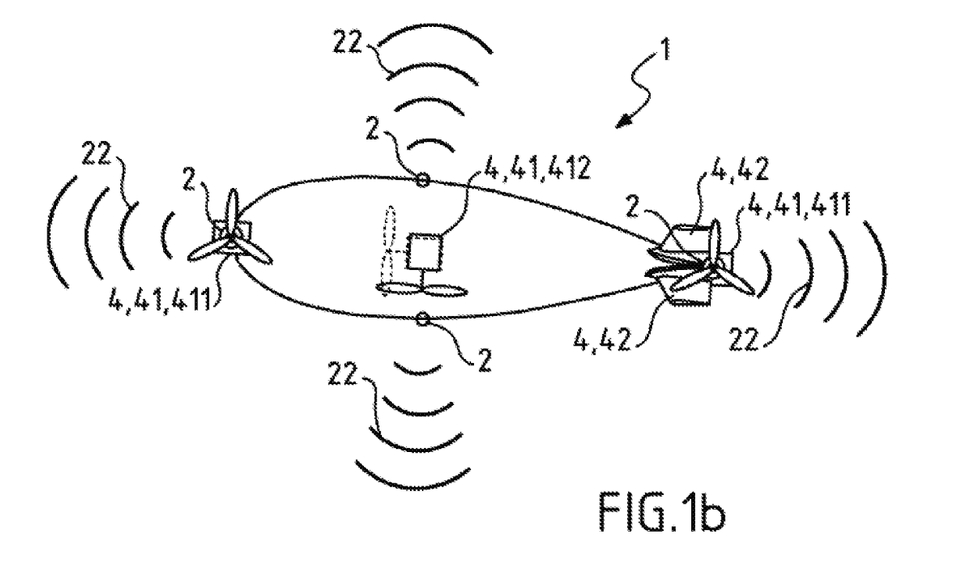
FIG. 1b is a diagrammatic profile view of the first embodiment of an aircraft 1 according to the invention.
Figure 2:
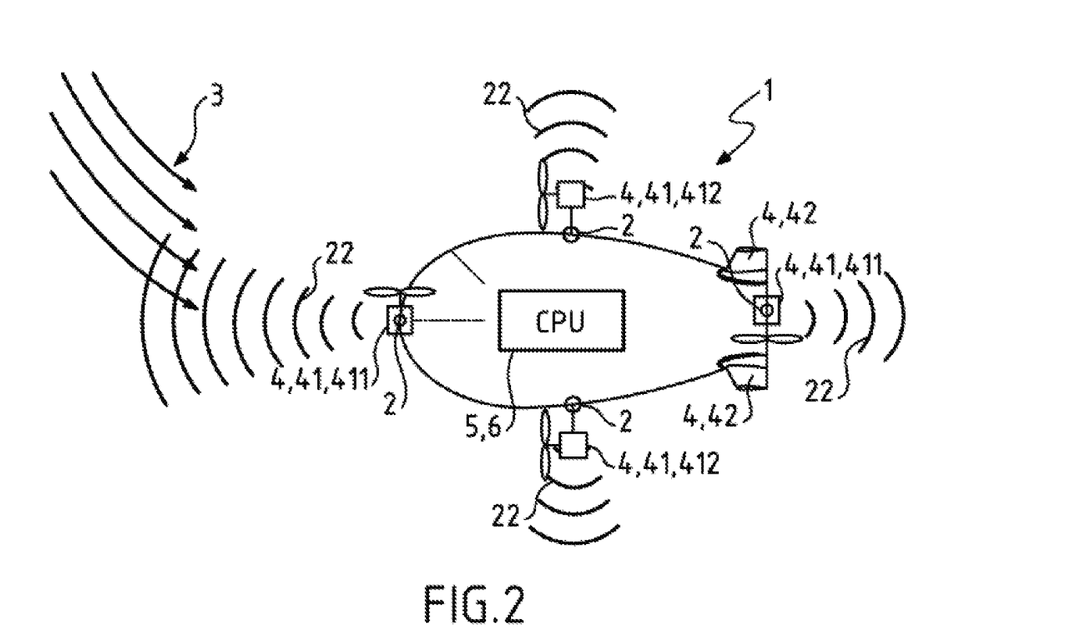
FIG. 2 is a diagrammatic top view of the aircraft 1 according to the invention towards which a gust of wind 3 is heading.
Figure 3:
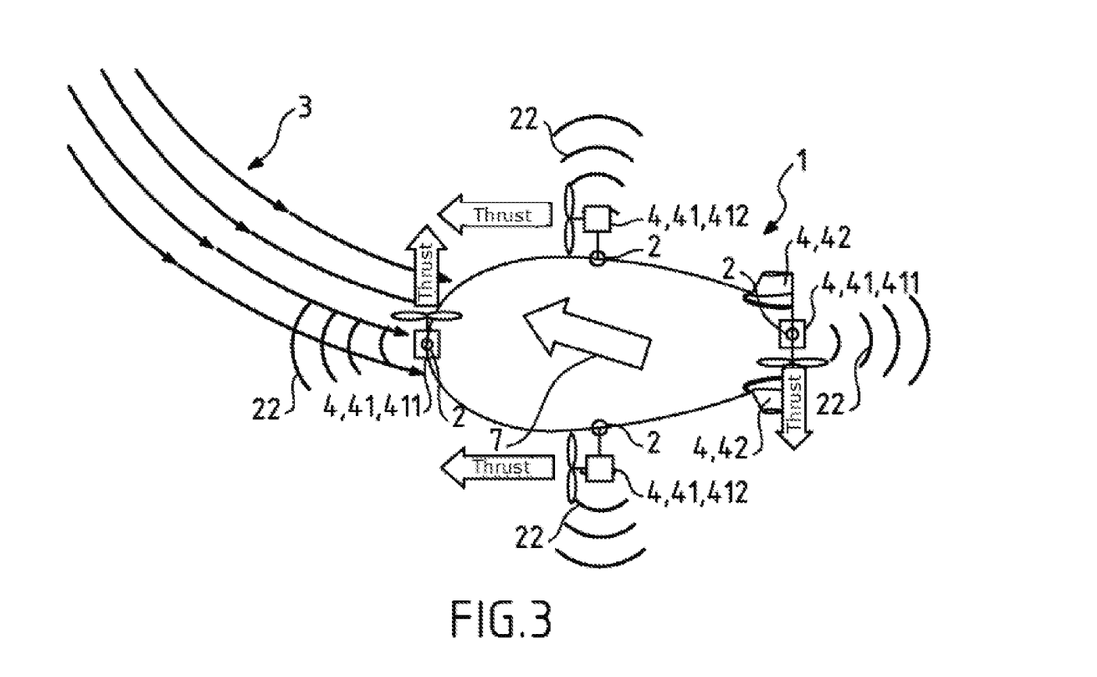
FIG. 3 is a diagrammatic top view of the aircraft 1 according to the invention compensating for the effects of this wind 3.
Figure 4:
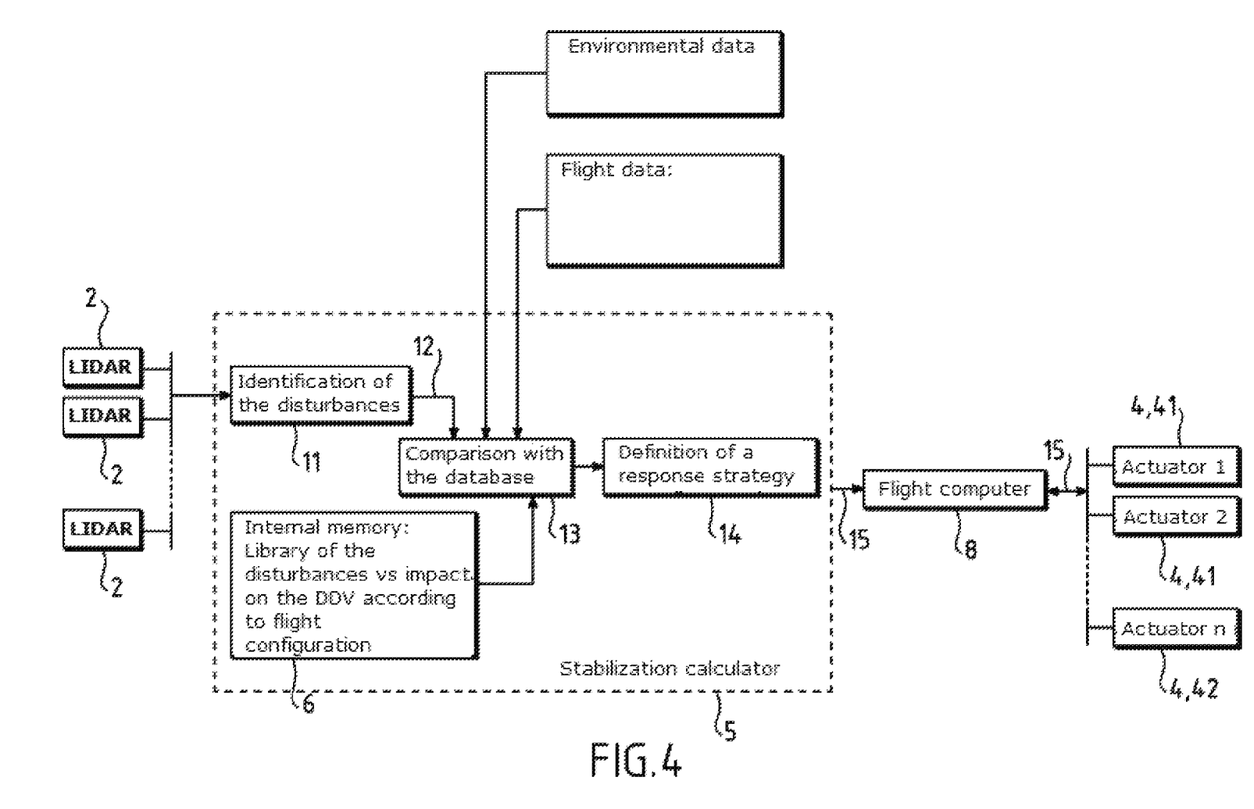
FIG. 4 is a diagrammatic view of a method according to the invention utilized in the aircraft 1.

Thus, the method utilized by the aircraft 1 typically comprises:

remote measurement of a wind 3 by the at least one sensor 2 of the aircraft 1 (step 11 in FIG. 4), or preferably several winds in several directions or from several origins (in FIGS. 1*a* and 1*b*, several sensors 2 are placed all around the aircraft 1 and take measurements all around the aircraft 1; in FIG. 2, a gust of wind 3 is detected by one of the sensors 2), then transformation, by the analysis and control means 5, of the measurement values originating from the at least one sensor 2 into a format adopted in (or compatible with) the database 6 (i.e. transformation of the measurement information into data that are known or can be used by the database 6). Typically, this transformation (carried out by the calculator 5) consists of reconstructing a wind field (i.e. a three-dimensional vector field representing directions and speeds of the wind 3 for several points of a space surrounding the aircraft 1) based on separate measurements from several of the sensors 2 (for example 24 beams with ten measurement points i.e. 240 points every second for a measurement at 1 Hz). On each measurement (every second for a measurement at 1 Hz), these points are interpolated in order to reconstruct this vector field analysis and control, by the analysis and control means 5, comprising:

receiving, originating from the at least one sensor 2, (step 12 in FIG. 4) measurement values of the wind 3, then searching (step 13 in FIG. 4), within the on-board database 6 in the aircraft 1, for a match with these wind measurement values originating from the at least one sensor 2, then determining (step 14 in FIG. 4), as a function of the result of this search, instructions to be sent to the actuators 4, (i.e. the calculator 5 analyzes the situation by comparing it to the database 6 and thus determines a response strategy), then sending these determined instructions (step 15 in FIG. 4) to the actuators 4 (via a flight control computer 8 of the aircraft 1, also called a Flight Director), the analysis and control means 5 sending the instructions directly to the actuators 4, without a step of validation or approval by a human operator (the measurement values of the wind 3 are processed by the calculator 5 and FIG. 3 shows that the response strategy is established and that the actuators 4 are operating so as to generate on the aircraft 1 a vectored thrust 7 that counters or compensates for the effects of the gust of the wind 3 on the aircraft 1).

Each of these steps can be utilized when the aircraft 1 performs a movement or performs (or at least intends to perform) hovering flight.

The at least one sensor 2 measures a wind 3 at a measurement frequency of at least 0.1 Hz, preferably at least 1 Hz. The analysis and control means 5 determine instructions to be sent to the actuators at a control frequency of at least 0.1 Hz, preferably at least 1 Hz.

This method is utilized continuously. To this end, the measurement step is reiterated at the measurement frequency (measurement frequency of 1 Hz for example) in order to follow the change in the wind 3. The analysis and control step is reiterated at the control frequency.

The search within the database 6 for a match with wind measurement values called "measured values" originating from the at least one sensor 2 is a search within the database 6 for wind measurement values called "stored values":

that are stored in the database 6 and that are associated with instructions intended for the actuators 4 as previously explained, and that match the "measured" wind measurement values:

exactly (the search result matches a single "scenario" or with a certain margin of error, typically plus or minus 1% of the measured values, or that are the closest possible of all the stored measurement values (the search result matches a single "scenario" or several very similar scenarios).

In cases where the search step 13 comprises a comparison between a three-dimensional "measured" field (originating from the at least one sensor 2) of vectors representing directions and speeds of the wind 3 in the space surrounding the aircraft 1 with the set of scenarios (i.e. stored values or stored three-dimensional vector fields representing directions and speeds of the wind 3 in the space surrounding the aircraft 1) stored in the database 6, the search result 13 typically matches different very similar scenarios, and the determination step 14 will supply a response for each actuator 4 in the form of a weighted composition of several instructions stored in the database 6 and associated with these different scenarios (in particular when the measured wind 3 comprises several gusts in several directions).

This method also comprises:
a measurement (not shown in FIG. 4) of the effects, on the position of the aircraft 1, of the associated instructions sent to the actuators 4, and then
if these effects are not satisfactory (the "satisfactory" character being obtained for example by comparing the measured effects with respect to a position stability threshold of the aircraft 1 in the case of hovering flight) a correction or modification (not shown in FIG. 4), by the analysis and control means 5, of the database 6 as a function of the measured effects. The system 2, 4, 5 and 6 records all the data, and can therefore carry out the correction or modification:
during the flight of the aircraft 1 ("Online") during which these data are measured, or
after the flight of the aircraft 1 ("Offline") during which these data are measured, so as to propose improvements to the database that will be implemented during maintenance sessions.

Thus, the invention operates by forecasting, i.e. the response of the aircraft 1 with respect to flight dynamics when facing a given wind 3 scenario is known beforehand. The resulting system has the advantage of being much more responsive than if the calculations needed to be carried out in real time. Furthermore, the responses can change as a function of the feedback. Each response is analyzed, and if the latter is not satisfactory, then the system 2, 4, 5, 6 can change its strategy.

Of course, the invention is not limited to the examples that have just been described and numerous amendments can be made to these examples without exceeding the scope of the invention.

For example, in a variant, each one of all or part of the sensors 2 can be replaced by a sensor (for example Pitot tubes and/or an anemometer) that is not arranged in order to measure the wind remotely, i.e. it is arranged in order to measure a wind only when this wind is in contact with the aircraft 1.

Moreover, in a "non-automatic" (less advantageous) variant, it is possible to give the pilot of the aircraft 1 a map of the aerological environment around the aircraft 1 (this map being established based on the values measured by the at least one sensor 2), thus leaving her free to act accordingly (with for example a recommendation on the choices to be taken).

Of course, the different features, forms, variants and embodiments of the invention can be combined together in various combinations if they are not incompatible or mutually exclusive. In particular, all the variants and embodiments previously described can be combined together.

The invention claimed is:
1. A Lighter-Than-Air (LTA) aircraft, comprising:
a plurality of remote sensors placed at different locations on the aircraft, said plurality of remote sensors being configured to remotely measure wind at a distance from the aircraft;
actuators, each of said actuators being configured to modify a position of the aircraft as a function of instructions received by the actuators to compensate for the remotely measured wind on the aircraft;
an on-board database in the aircraft, the on-board database storing different remote wind measurement values from the remote sensors and different instructions intended for the actuators associated with the remote wind measurement values; and
analysis and control means programmed to:
receive the remote wind measurement values originating from the plurality of remote sensors;
search, within the on-board database, for a match between the remote wind measurement values originating from the plurality of remote sensors and the stored instructions, and determine, as a function of the search, operational instructions from the stored instructions to be sent to the actuators so as to generate on the aircraft a vectored thrust that counters or compensates for the effects of a gust of said remotely measured wind on said aircraft; and
send the determined operational instructions to the actuators so as to generate on the aircraft a vectored thrust that counters or compensates for the effects of a gust of said remotely measured wind on said aircraft,
wherein the on-board database comprises:
data beforehand obtained by aerodynamic calculations that simulate the effects of several remote wind measurement values on the LTA aircraft, and theoretical instructions calculated to be sent to said actuators, so as to compensate for wind effects, and/or
empirical data beforehand obtained by submitting the LTA aircraft to different wind values and instructions beforehand sent to said actuators and tested until the effects of the wind values are substantially compensated for,
wherein the plurality of remote sensors are arranged to remotely measure the wind in several directions, the plurality of sensors being arranged together for taking remote wind measurement values at the different locations for several points in space around the aircraft, the database associating the remote wind measurement values at the different locations with different instructions intended for the actuators so as to generate on the aircraft a vectored thrust that counters or compensates for the effects of a gust of said remotely measured wind on said aircraft, the instructions being provided to the actuators to adjust a position of the aircraft to compensate for the effect of the wind on the aircraft,
the sensors being arranged to measure the wind remotely, before the wind comes into contact with the aircraft,
the remote wind measurement values for the several points in space around the aircraft, comprising:
at least one amplitude or at least one variation in the amplitude of the wind, and
at least one origin of the wind relative to the aircraft and/or a direction of the wind, or
at least one variation in the origin of the wind relative to the aircraft or at least one variation in the direction of the wind.

2. The LTA aircraft according to claim 1, wherein the aircraft is configured to perform hovering flight.

3. The LTA aircraft according to claim 1, wherein the analysis and control means are programmed to send the operational instructions directly to the actuators, without the need for a validation or approval step by a human operator.

4. The LTA aircraft according to claim 1, further comprising:
  means for measuring the effects, on the position of the aircraft, of the determined operational instructions sent to the actuators, and
  the analysis and control means are programmed to modify the instructions stored in the database as a function of the measured effects.

5. The LTA aircraft according to claim 1, wherein the actuators comprise at least one of propulsion means and control surfaces.

6. The LTA aircraft according to claim 1, wherein the plurality of remote sensors are configured to measure winds in several directions or from several origins.

7. A method for stabilizing a Lighter-Than-Air (LTA) aircraft, comprising:
  measuring remote wind values at a distance from the aircraft using a plurality of sensors at different locations on the aircraft;
  analysis and control, by on-board analysis and control means in the aircraft, comprising:
  receiving remote wind measurement values originating from the plurality of sensors at the different locations on the aircraft;
  searching, within an on-board database in the aircraft, for a match between the different wind measurement values and different stored instructions intended for actuators of the aircraft;
  determining, as a function of this search, operational instructions from the stored instructions, to be sent to the actuators so as to generate on the aircraft a vectored thrust that counters or compensates for the effects of a gust of said remotely measured wind on said aircraft; and
  sending the determined operational instructions to the actuators so as to generate on the aircraft a vectored thrust that counters or compensates for the effects of a gust of said remotely measured wind on said aircraft, the actuators modifying a position of the aircraft as a function of operational instructions received by these actuators to compensate for the effect of the wind on the aircraft based on the remote wind measurement values measured at a distance from the aircraft, wherein said on-board database searching comprises:
  searching within data beforehand obtained by aerodynamic calculations that simulate the effects of several remote wind measurement values on the LTA aircraft, and theoretical instructions calculated to be sent to said actuators, so as to compensate for said wind effects, and/or
  searching within empirical data beforehand obtained by submitting the LTA aircraft to different wind values and instructions beforehand sent to said actuators and tested until the effects of said wind values are substantially compensated for,
  wherein the plurality of sensors measure wind values in several directions, the plurality of sensors taking remote wind measurement values at the different locations, the database associating the remote wind measurement values at the different locations with different instructions intended for the actuators so as to generate on the aircraft a vectored thrust that counters or compensates for the effects of a gust of said remotely measured wind on said aircraft, wherein the operational instructions are provided to the actuators to adjust a position of the aircraft to compensate for the effect of the wind on the aircraft,
  the sensors measuring the wind remotely, before the wind comes into contact with the aircraft,
  the remote wind measurement values comprising, for several points in space around the aircraft:
  at least one amplitude or at least one variation in the amplitude of the wind, and
  at least one origin of the wind relative to the aircraft and/or a direction of the wind, or
  at least one variation in the origin of the wind relative to the aircraft or at least one variation in the direction of the wind.

8. The method according to claim 7, wherein the LTA aircraft performs hovering flight.

9. The method according to claim 7, wherein the analysis and control means send the operational instructions directly to the actuators, without a validation or approval step by a human operator.

10. The method according to claim 7, further comprising:
  measuring the effects, on the position of the aircraft, of the determined operational instructions sent to the actuators; and
  modifying the instructions stored in the on-board database by the analysis and control means, as a function of the measured effects.

11. The method according to claim 7, wherein the actuators comprise at least one of propulsion means and control surfaces.

12. The method according to claim 7, wherein the plurality of sensors measure winds in several directions or from several origins.

13. The LTA aircraft according to claim 1, wherein at least one of said actuators includes propulsion means facing a front end of the aircraft.

14. The LTA aircraft according to claim 13, wherein at least two of said actuators includes propulsion means facing in opposite lateral directions.

15. The LTA aircraft according to claim 1, wherein at least two of said actuators includes propulsion means facing in opposite lateral directions.

16. The LTA aircraft according to claim 13, wherein said actuators are positioned in the same horizontal plane.

* * * * *